(12) United States Patent
Buttolo et al.

(10) Patent No.: US 11,518,291 B2
(45) Date of Patent: Dec. 6, 2022

(54) DELIVERY VEHICLE WITH FLEXIBLE STORAGE

(71) Applicant: Ford Global Technologies, LLC, Dearborn, MI (US)

(72) Inventors: Pietro Buttolo, Dearborn Heights, MI (US); Stuart C. Salter, White Lake, MI (US); Annette L. Huebner, White Lake, MI (US); Paul K. Dellock, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 433 days.

(21) Appl. No.: 16/758,436

(22) PCT Filed: Oct. 24, 2017

(86) PCT No.: PCT/US2017/057989
§ 371 (c)(1),
(2) Date: Apr. 23, 2020

(87) PCT Pub. No.: WO2019/083502
PCT Pub. Date: May 2, 2019

(65) Prior Publication Data
US 2020/0247302 A1    Aug. 6, 2020

(51) Int. Cl.
*B60P 3/00* (2006.01)
*B60J 5/04* (2006.01)
(Continued)

(52) U.S. Cl.
CPC ............. *B60P 3/007* (2013.01); *A47B 45/00* (2013.01); *B60J 5/0491* (2013.01); *B60R 7/02* (2013.01);
(Continued)

(58) Field of Classification Search
CPC .......... B60P 3/007; B60J 5/0491; B60R 7/02; A47B 45/00
See application file for complete search history.

(56) References Cited

U.S. PATENT DOCUMENTS 3,086,585 A    4/1963  Stark
4,211,443 A    7/1980  Butts et al.
(Continued)

FOREIGN PATENT DOCUMENTS

CN        204972812 U       1/2016
DE    10 2013 004 537 A1    9/2013

OTHER PUBLICATIONS

International Search Report of the International Searching Authority for PCT/US2017/057989 dated Jan. 8, 2018.

*Primary Examiner* — Jason S Morrow
(74) *Attorney, Agent, or Firm* — Brandon Hicks; MacMillan, Sobanski & Todd, LLC

(57) ABSTRACT

A delivery vehicle has separate compartments with a common sidewall. Doors that are interchangeable between the compartments close the compartments. A latching assembly between the doors and sidewall limits movement of the sidewall when only one of the doors is closed. The compartments are combined into a single compartment by moving the sidewall when the doors are open. A hinge assembly connects the doors. A contact and wiper assembly between the doors carries power and commands for the hinge assembly.

20 Claims, 9 Drawing Sheets

(51) Int. Cl.
  *B60R 7/02* (2006.01)
  *A47B 45/00* (2006.01)
  *E05D 11/10* (2006.01)
  *G05D 1/00* (2006.01)
  *G06Q 10/08* (2012.01)
  *A47B 47/00* (2006.01)

(52) U.S. Cl.
  CPC ........... *A47B 47/0091* (2013.01); *E05D 11/10* (2013.01); *G05D 1/0088* (2013.01); *G06Q 10/083* (2013.01)

(56) References Cited

U.S. PATENT DOCUMENTS

| | | | |
|---|---|---|---|
| 4,747,280 | A | 5/1988 | Shaw |
| 9,487,248 | B1 | 11/2016 | Buckhalt et al. |
| 10,624,484 | B1* | 4/2020 | Mountford ................ B60P 3/03 |
| 10,654,394 | B2* | 5/2020 | Goldberg ............ G07F 17/0064 |
| 2008/0029517 | A1 | 2/2008 | Briers |
| 2011/0168104 | A1 | 7/2011 | Matteson et al. |
| 2019/0278274 | A1* | 9/2019 | Igata .................. G06Q 30/0607 |
| 2020/0130893 | A1* | 4/2020 | Väin ........................ G07C 9/30 |
| 2020/0223347 | A1* | 7/2020 | Hara ....................... B60P 3/007 |
| 2022/0009398 | A1* | 1/2022 | Piontek .................. B61D 47/00 |
| 2022/0084340 | A1* | 3/2022 | Hall ........................ B60L 53/80 |

\* cited by examiner

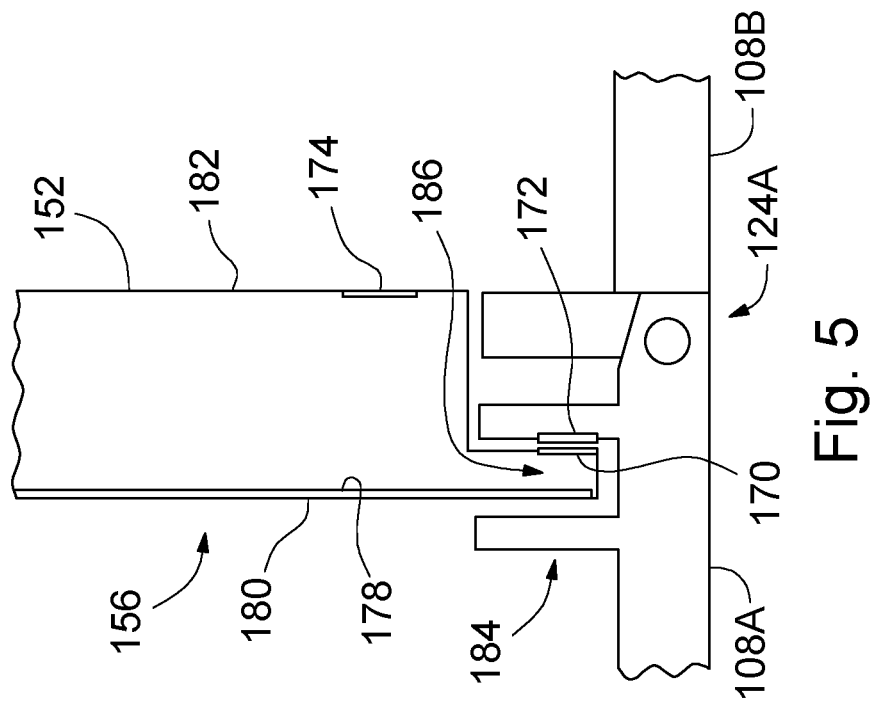
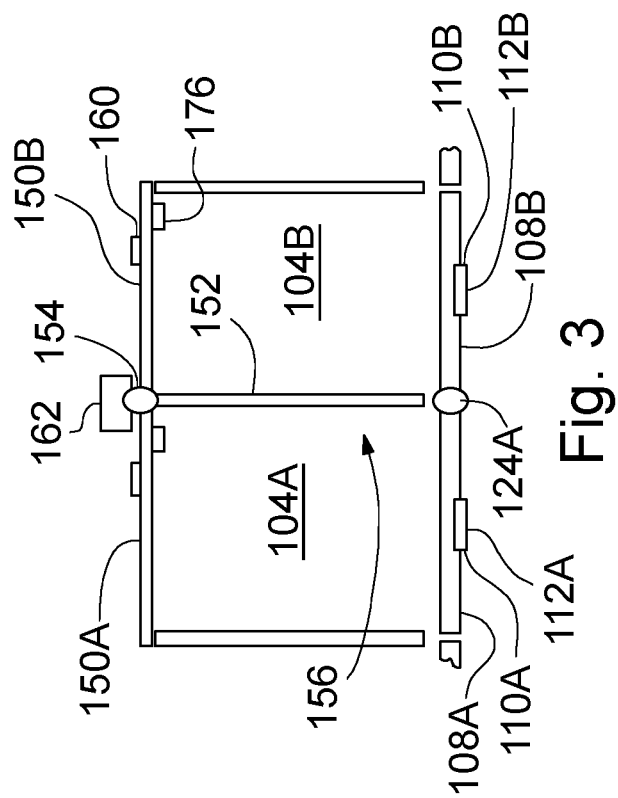
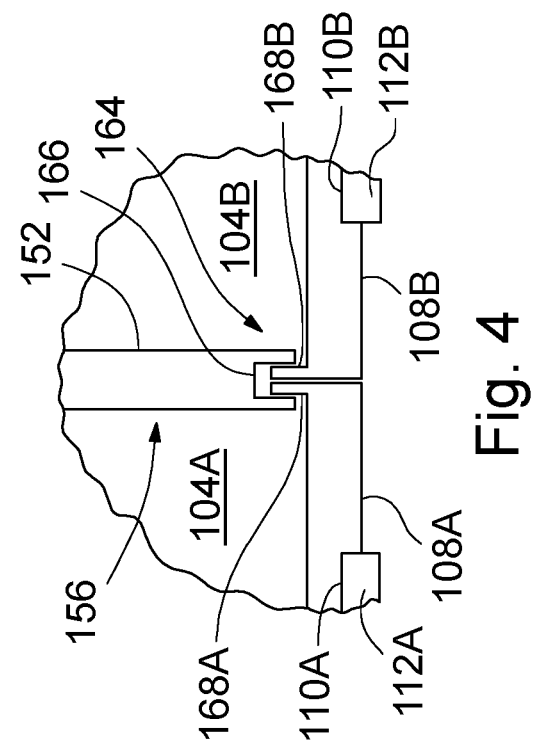

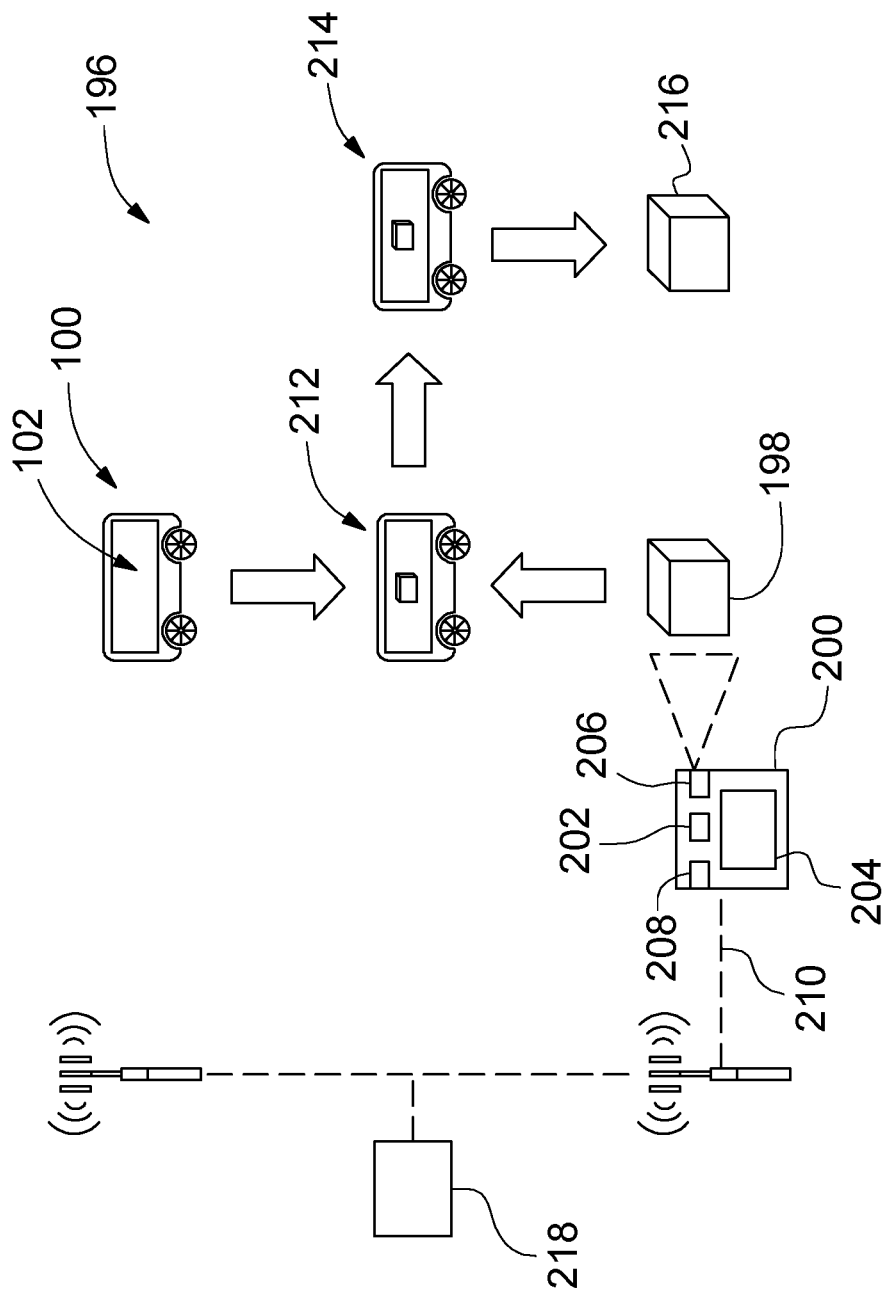

DELIVERY VEHICLE WITH FLEXIBLE STORAGE

BACKGROUND OF INVENTION

The present invention relates to flexible storage compartments and in particular to a flexible storage compartment system for use with an autonomous delivery vehicle.

Delivery vehicles, such as trucks or vans, are typically driven by a driver, and have a cargo area in which packages to be delivered are stored during transit. The cargo area is typically a single, common space into which the packages are loaded for transit and then unloaded from for delivery. The cargo area may have shelves for holding the packages, an internal aisle between the shelves, and front and rear doors for the driver to access this area. When delivering packages, the driver drives the delivery vehicle to each recipient, retrieves the recipient's package from the cargo area, and then personally delivers the package to the recipient.

For an autonomous—i.e., self-driving—delivery vehicle, a driver is not needed for driving. Instead, the autonomous delivery vehicle drives itself to each of the recipients. The recipient then retrieves the package from the autonomous delivery vehicle. To prevent the recipient from mistakenly taking an incorrect package, the autonomous vehicle may have a plurality of individual shipping compartments. Each package is loaded into a separate compartment that is then locked prior to sending out the autonomous vehicle for deliveries. When the delivery is made, only the compartment corresponding to the present delivery is unlocked for the recipient to remove the package.

However, most packages loaded into the compartments have sizes smaller than a maximum capacity of the corresponding compartment into which it is loaded. Indeed, many of the packages may be significantly smaller than the maximum capacity of the bins. This results in wasted space in the compartments and wasted capacity for the autonomous delivery vehicle. While different sized compartments may be provided for the different sizes of packages, space is again wasted because the packages typically vary significantly in size from day to day while the compartments remain fixed in size.

SUMMARY OF INVENTION

An embodiment contemplates a flexible storage compartment system for a delivery vehicle. Adjoining first and second compartments have a common sidewall that is pivotable about a hinge. A first removable door closes the first compartment and a second removable door closes the second compartment. The first and second doors are interchangeable between the first and second compartments. A latching assembly is between the first door, second door, and sidewall. Both the first and second doors are open when the latching assembly allows the sidewall to move. Hinge assemblies connect the first and second doors. The hinge assemblies have solenoids selectively operable between locked and unlocked states. Contact and wiper assemblies are between the first and second doors. The contact and wiper assemblies carry electrical power and command signals for the solenoids. An electronic device sizes a package and assigns the first and second compartments. The first and second compartments combine into a single compartment by pivoting the sidewall when the first and second doors are both open.

Another embodiment contemplates a delivery vehicle. Separate compartments have a common sidewall. Doors that close the compartments are interchangeable between the compartments. A latching assembly between the doors and sidewall limits movement of the sidewall when only one of the doors is closed. The compartments are combined into a single compartment by moving the sidewall when the doors are open. A hinge assembly connects the doors. Between the doors is a contact and wiper assembly carrying power and commands for the hinge assembly.

Another embodiment contemplates a method of shipping a package in a delivery vehicle. The delivery vehicle has a flexible storage compartment system with first and second compartments with a common sidewall, a first door closing the first compartment, and a second door closing the second compartment. The package is sized with an electronic device. The first and second compartments are assigned with the electronic device. The first and second doors are unlocked. A command signal to unlock the first and second doors is carried by a contact and wiper assembly between the first and second doors. The first and second doors are opened. The sidewall is moved to combine the first and second compartments into a combined compartment. Both the first and second doors are open when the sidewall moves. The package is loaded into the combined compartment. The first and second doors are replaced. The first and second doors are interchangeable between the first and second compartments.

An advantage of an embodiment is more efficiently using the storage compartments on a delivery vehicle by configuring the size of a specific compartment to correspond to the size of a specific package when that package is loaded into that compartment.

BRIEF DESCRIPTION OF DRAWINGS

FIG. 3 is a section view taken along line 3-3 of FIG. 2.

FIG. 4 is a section view taken along line 4-4 of FIG. 2.

FIG. 5 is a section view taken along line 5-5 of FIG. 2.

FIG. 8 is a schematic view of a method of shipping a package with the flexible storage compartment system of FIG. 1.

DETAILED DESCRIPTION

Figure 1:
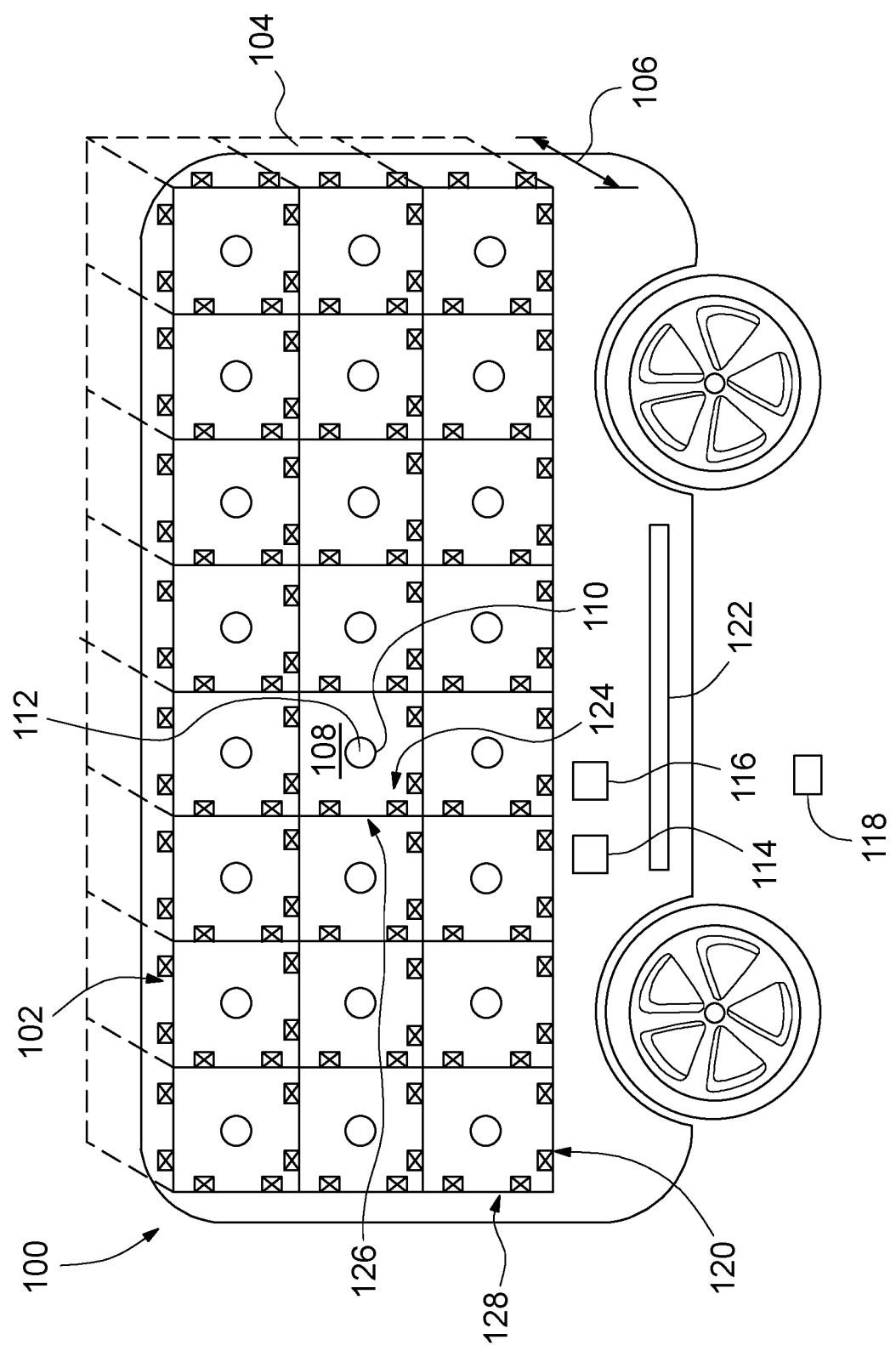
FIG. 1 is a schematic side view of an autonomous delivery vehicle having a flexible storage compartment system.
Figure 2:
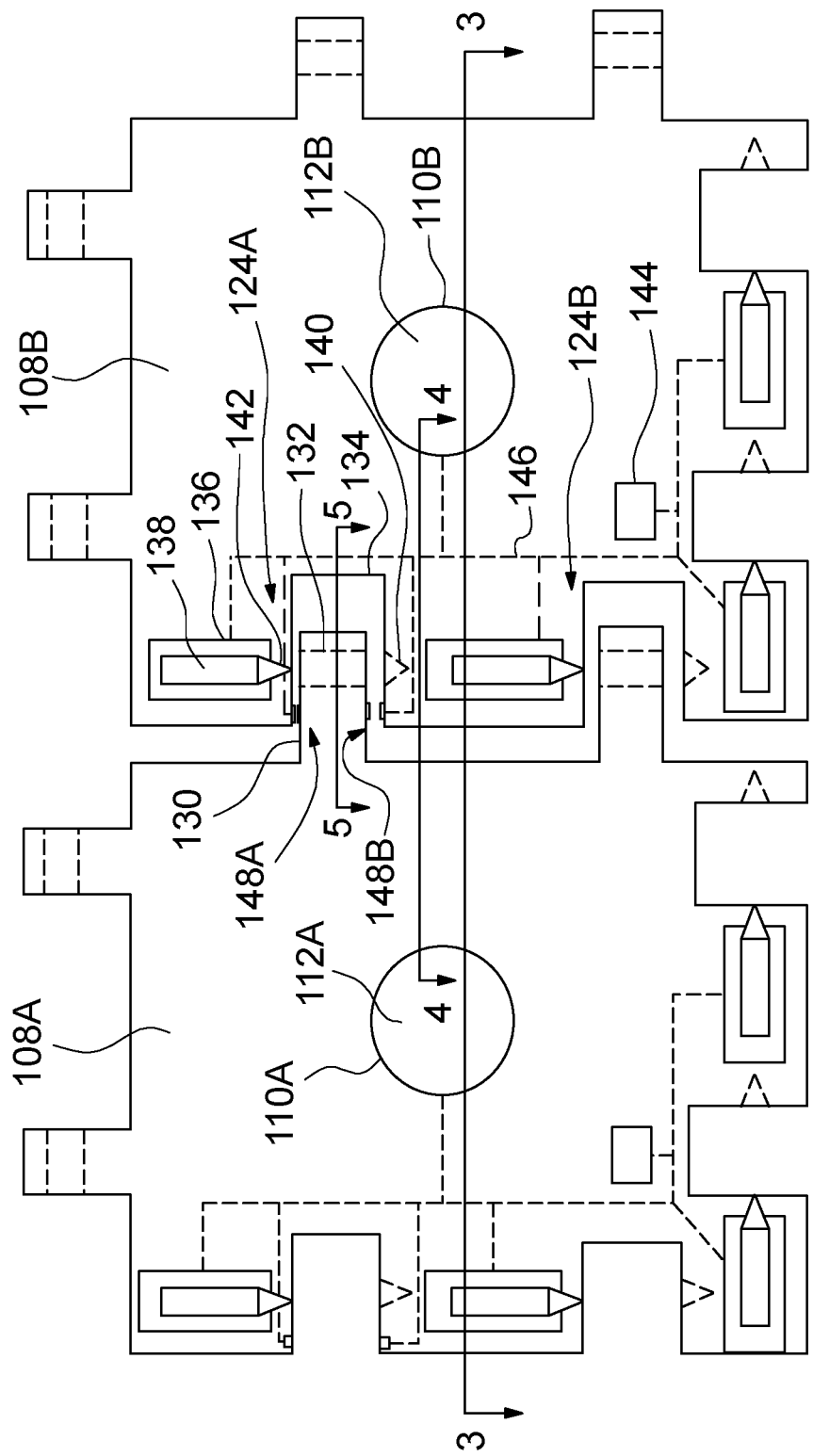
FIG. 2 is a schematic elevation view of compartment doors of the flexible storage compartment system of FIG. 1.

Referring now to FIG. 1, there is illustrated a delivery vehicle, indicated generally at 100, having a flexible storage compartment system, indicated generally at 102. The vehicle 100 is preferably an autonomous or self-driving vehicle—i.e., the vehicle 100 does not require a driver to drive the vehicle. Instead, the vehicle 100 drives itself along a delivery route comprising various pickups and deliveries. Furthermore, as a non-limiting example, the vehicle 100 may be an electric vehicle propelled by electric motors powered by batteries.

The system 102 comprises a plurality of storage compartments 104 having depths 106 (the depths 106 are illustrated in FIG. 1 by dashed lines) arranged in a matrix. The depths 106 define a space for each of the compartments 104 in which a package may be stored for delivery. Each of the compartments 104 corresponds with a compartment door 108 that closes the compartment 104. The doors 108 are selectively changeable between locked and unlocked states. When unlocked, the doors 108 are opened or removed to access interiors of the corresponding compartments 104.

Each of the doors 108 is interchangeable. When the doors 108 are removed from the compartments 104, the removed doors 108 may be returned to any of the compartments 104. The removed doors 108 are not limited to only being returned to the specific compartments 104 from which the doors 108 were removed.

As will be discussed further, each of the compartments 104 has a handle 110 in which an indicator light 112 is incorporated. For each of the doors 108 that is unlocked, the indicator lights 112 of the unlocked doors 108 change color to indicate the doors 108 are unlocked. For example, the indicator lights 112 may change from red to green to indicate the doors 108 are unlocked. Furthermore, the indicator lights 112 may flash in a sequence for removal or opening of the doors 108.

As will be discussed, the system 102 may include a human machine interface 114 mounted on an exterior of the vehicle 100 for unlocking the doors 108. As non-limiting examples, the interface 114 may be a display screen and numerical keypad arrangement or a touchscreen. Alternatively, as a further non-limiting example, the system 102 may include a Bluetooth low-energy (BLE) radio 116 for performing a wireless "handshake" to unlock the doors 108. The "handshake" occurs when the BLE radio 116 detects that a one-time use BLE token 118 has been brought to the vehicle 100. The system 102 may include either or both the interface 114 and BLE radio 116.

The system 102 further has a frame portion, indicated generally at 120. The frame portion 120 surrounds an outside perimeter of the matrix of compartments 104. The vehicle 100 may have a retractable storage shelf 122 for temporarily storing removed doors 108 while the compartments 104 are open for loading or unloading. The storage shelf 122 may have slots or grooves for vertically standing the removed doors 108 on end.

The doors 108 are interconnected in the matrix by a plurality of hinge assemblies, indicated generally at 124 and denoted by X's in FIG. 1. The plurality of hinge assemblies 124 also connect the doors 108 to the frame portion 120. As illustrated, interconnections, indicated generally at 126, between each of the abutting doors 108 comprise two of the hinge assemblies 124. The interconnections 126 are between any two abutting doors 108. As non-limiting examples, the interconnections 126 may be between doors 108 above or below, or to left or right of, each other when facing the doors 108. As also illustrated, perimeter connections, indicated generally at 128, between the frame portion 120 and each of the doors 108 that abut the frame portion 120 also comprise two of the hinge assemblies 124. Alternatively, the interconnections 126 and perimeter connections 128 may comprise more or less than two of the hinge assemblies 124.

Each of the hinge assemblies 124 is structurally and functionally the same as the others of the hinge assemblies 124. Unless otherwise noted, discussion of any one of the hinge assemblies 124 also applies to the others of the hinge assemblies 124, including the hinge assemblies 124 for the interconnections 126 and perimeter connections 128. Discussion of the interconnections 126 also applies to the perimeter connections 128, and vice versa, unless otherwise noted. The commonality between the individual hinge assemblies 124 facilitates the doors 108 being interchangeable between the compartments 104.

As illustrated, the matrix of compartments 104 has twenty four of the compartments 104 arranged in three rows and eight columns. Alternatively, the matrix of compartments 104 may have greater or fewer than the twenty four compartments 104 illustrated. Alternatively, the matrix of compartments 104 may be arranged other than in the grid of three rows and eight columns.

As illustrated, the compartments 104 are cuboid structures. Alternatively, the compartments 104 may be other than cuboid structures. For example, the compartments 104 may be any structural shape (or shapes) whose interior is accessed via the doors 108.

As illustrated, the doors 108 are rectilinear such that they have four perimeter sides. Alternatively, the doors 108 may be other than rectilinear. For example, the doors 108 may be triangular with three perimeter sides or hexagonal with six perimeter sides. Whatever the shape of the doors 108, the interconnections 126 and perimeter connections 128 each have at least one of the hinge assemblies 124. Preferably, shapes of the doors 108 correspond to shapes of the compartments 104 such that the doors 108 close the compartments 104. Alternatively, the doors 108 may have shapes different than the shapes of the compartments 104. As a non-limiting example, the cuboid compartments 104 illustrated may each have two triangular shaped doors.

Referring now to FIGS. 2-5, there is illustrated the interconnection 126 between first and second compartment doors 108A and 108B, respectively. The interconnection 126 between the first and second doors 108A and 108B, respectively, comprises first and second hinge assemblies, indicated generally at 124A and 124B, respectively. Discussion of one of the first and second hinge assemblies 124A and 124B, respectively, also applies to the other of the first and second hinge assemblies 124A and 124B, respectively.

Furthermore, the first and second hinge assemblies 124A and 124B, respectively, are representative of all of the hinge assemblies 124, including the hinge assemblies 124 between adjoining doors 108 and between the doors 108 and the frame portion 120. Discussion of the first and second hinge assemblies 124A and 124B, respectively, also applies to the hinge assemblies 124 between adjoining doors 108 and between the doors 108 and the frame portion 120.

The first hinge assembly 124A has a hinge knuckle 130 extending outwardly from the first door 108A. Extending through the hinge knuckle 130 is a passive first hinge cavity 132. The hinge knuckle 130 corresponds with, and extends into, a notch 134 in the second door 108B.

The first hinge assembly 124A also has an active solenoid 136 and plunger 138 on the second door 108B. The plunger 138 is aligned with the first hinge cavity 132 when the hinge knuckle 130 is in the notch 134. The second door 108B also has a second hinge cavity 140 aligned with the first hinge cavity 132. The solenoid 136 is selectively controlled to extend and retract the plunger 138 through the first hinge cavity 132. When the plunger 138 is extended through the first hinge cavity 132, a tip portion 142 of the plunger 138 extends into the second hinge cavity 140. A depth of the second hinge cavity 140 may be increased to increase stability of the hinge assembly 124A supporting the first and second doors 108A and 108B, respectively.

When the plunger 138 is extended through the first hinge cavity 132 and into the second hinge cavity 140, the first hinge assembly 124A acts as a hinge between the first and second doors 108A and 108B, respectively. The plunger 138 extended through the first hinge cavity 132 and into the second hinge cavity 140 also locks the first and second doors 108A and 108B, respectively, together about the first hinge assembly 124A.

When the plunger 138 is retracted from the first and second hinge cavities 132 and 140, respectively, the first hinge assembly 124A is in an unlocked state. When both the first and second hinge assemblies 124A and 124B, respectively, are in the unlocked state, then the first and second doors 108A and 108B, respectively, are unlocked relative to each other and may be separated. As a result, the hinge assemblies 124 are both hinges and locks for each of the doors 108.

The hinge assemblies 124 are provided for all of the interconnections 126 and perimeter connections 128 (the perimeter connections 128 being provided, as discussed, for the doors 108 abutting the frame portion 120) for each of the doors 108. For a specific door 108, when the hinge assemblies 124 for all but one of the interconnections 126 (or, if the specific door 108 abuts the frame portion 120, the perimeter connections 128) are unlocked, then the specific door 108 may swing open and the corresponding compartment 104 accessed. For the specific door 108, when the hinge assemblies 124 for all of the interconnections 126 (and, if the specific door 108 abuts the frame portion 120, perimeter connections 128 as well), are unlocked, then the specific door 108 may be detached or otherwise fully removed from the corresponding compartment 104 and the corresponding compartment 104 accessed.

Each of the doors 108 further has a microprocessor 144. The microprocessor 144 communicates with the solenoids 136 and indicator light 112 via a combined local interconnect network (LIN) and power bus 146. The microprocessor 144 controls a color displayed by the indicator light 112 and operation of the solenoids 136.

At the hinge knuckle 130 are first and second spring loaded contact and wiper assemblies, indicated generally at 148A and 148B, respectively. The first and second spring contact and wiper assemblies 148A and 148B, respectively, are connected to the LIN and power bus 146 to carry or otherwise transfer electrical power and control signals between the first and second doors 108A and 108B, respectively. As such, the doors 108 form a chain through which the electrical power and control signals are supplied to the doors 108. The electrical power and control signals are for operation of the indicator light 112 and solenoid 136.

As discussed, the doors 108 are all the same and may be installed on any of the compartments 104. The LIN and power bus 146 of each of the doors 108 is used with auto addressing. With auto addressing, the doors 108 may be installed on the compartments 104 in any order. As a result, when multiple doors 108 are removed from the compartments 104, a sequence in which the doors 108 were removed does not need to be recorded.

The microprocessor 144 executes the auto addressing when the doors 108 are reinstalled on the compartments 104. Each of the doors 108 is a node of the LIN. The microprocessor 144 assigns unique addresses to the nodes—i.e., the doors 108—as a function of a specific compartment 104 that a specific door 108 is installed on as the removed doors 108 are reinstalled. The doors 108 do not maintain addresses independent of which compartment 104 the doors 108 are presently installed on.

As illustrated in FIG. 3, the first door 108A closes a first compartment 104A having a first rear wall 150A and the second door 108B closes a second compartment 104B having a second rear wall 150B. As non-limiting examples, the first and second compartments 104A and 104B, respectively, may be arranged horizontally or vertically relative to each other. Discussion of the first and second rear walls 150A and 150B, respectively, applies to the rear walls of all of the compartments 104.

The first and second rear walls 150A and 150B, respectively, may be a single rear wall with separate portions for the first and second compartments 104A and 104B, respectively. Extending between the first and second rear walls 150A and 150B, respectively, and the first and second doors 108A and 108B, respectively, is a common sidewall 152. Each of the compartments 104 shares at least one of the sidewalls 152 with an adjoining compartment 104. The sidewall 152 is mounted on a sidewall hinge 154 such that the sidewall is pivotally connected to the first or second rear wall 150A or 150B, respectively. Electrical connections are carried across the sidewall hinge 154. For example, the electrical connections carry sensor output signals.

The sidewall 152 operates the same regardless of the spatial arrangement of the first and second compartments 104A and 104B, respectively. As non-limiting examples, the sidewall 152 may be between the first and second compartments 104A and 104B, respectively, when the first and second compartments 104A and 104B, respectively, are positioned horizontally or vertically relative to each other.

The sidewall 152 is selectively restrained by the first and second doors 108A and 108B, respectively, in a manner to be discussed. In FIG. 3, the sidewall 152 is in a first position, indicated generally at 156. The sidewall 152 is also in the first position 156 in FIGS. 6B and 7A. When released by the first and second doors 108A and 108B, respectively, the sidewall 152 may be swung against the first or second rear wall 150A or 150B, respectively. For example, when the sidewall hinge 154 is mounted to the first rear wall 150A, the sidewall 152 is preferably swung against the first rear wall 150A and, when the sidewall hinge 154 is mounted to the second rear wall 150B, the sidewall 152 is preferably swung against the second rear wall 150B. Once swung against the first or second rear wall 150A or 150B, respectively, the sidewall 152 is in a second position 158 (illustrated in FIGS. 6C and 7B).

The sidewall 152 is secured in the second position 158. As a non-limiting example, the sidewall 152 may be secured in the second position 158 by being latched to the first or second rear wall 150A or 150B, respectively, against which the sidewall 152 was swung. The sidewall 152 may be latched in the second position by a latching mechanism 160. As non-limiting examples, the latching mechanism 160 may be either a mechanical mechanism—e.g., a push type latch mechanism—or by a solenoid release mechanism.

The sidewall 152 is spring loaded to return to the first position 156 when unlatched or released from the second position 158. The spring may be incorporated into the sidewall hinge 154. The spring loading also keeps the sidewall 152 in the first position 156 when the first and second doors 108A and 108B, respectively, are removed so that the sidewall 152 does not swing unintendedly.

The sidewall 152 may be manually moved between the first and second positions 156 and 158, respectively. Alternatively, the sidewall 152 may be moved between the first and second positions 156 and 158, respectively, by an actuator 162. The actuator 162 may be omitted if only manually movement of the sidewall 152 is desired. The sidewall 152 is provided with detents at the first and second positions 156 and 158, respectively.

Referring now to FIG. 4, there is illustrated a latching assembly, indicated generally at 164, between the first door 108A, second door 108B, and sidewall 152. The latching assembly 164 has a latching cavity 166 in the sidewall 152, a first latching key 168A on the first door 108A, and a second latching key 168B on the second door 108B. When the first and second doors 108A and 108B, respectively, are closed, and the sidewall 152 is in the first position 156, the first and second latching keys 168A and 168B, respectively, extend into the latching cavity 166. The first and second latching keys 168A and 168B, respectively, each independently limit or otherwise restrain the sidewall 152 from pivoting about the sidewall hinge 154 and being moved into the second position 158.

When only one of the first and second doors 108A or 1086, respectively, is closed, the first or second latching key 168A and 168B, respectively, associated with the closed door still limits or otherwise restrains the sidewall 152 from pivoting or otherwise moving on the sidewall hinge 154. Thus, for example, when the first door 108A is open and the second door 1086 is closed, the first compartment 104A may be accessed but the sidewall 152 cannot be moved on the sidewall hinge 154 to access the second compartment 1046. For the sidewall 152 to be moved on the sidewall hinge 154, both the first and second doors 108A and 108B must be opened so that both the first and second latching keys 168A and 168B, respectively, are withdrawn from the latching cavity 166.

Referring now to FIG. 5, there are illustrated sensors for the first hinge assembly 124A. The sidewall 152 is a large flooded X capacitive sensor. The individual sensors are capacitive sensors that may be formed with conductive polymers. As non-limiting examples, the conductive polymers may be in molding, flex circuits, or conductive paint.

A first capacitive sensor 170 is located on the sidewall 152 and a first conductor 172 is located on the first door 108A. The first sensor 170 and first conductor 172 are positioned to be adjacent when the sidewall 152 is in the first position 156 and the first door 108A is closed. The first sensor 170 communicates a first output signal to the microprocessor 144 (illustrated in FIG. 2). As the first sensor 170 approaches the first conductor 172, the first output signal, as measured by the microprocessor 144, increases. The increasing first output signal indicates the first door 108A is closing. Once the first output signal is greater than a first threshold value, the first door 108A is properly closed. When the first door 108A is properly closed, the microprocessor 144 may operate the solenoid 136 to lock the first door 108A.

A second capacitive sensor 174 is positioned on the sidewall 152 near the second door 1086. A second conductor 176 (illustrated in FIG. 3) is positioned on the second rear wall 1506. The second sensor 174 and second conductor 176 are positioned to be adjacent when the sidewall 152 is in the second position 158. The second sensor 174 communicates a second output signal to the microprocessor 144. As the second sensor 174 approaches the second conductor 176, the second output signal, as measured by the microprocessor 144, increases. The increasing second output signal indicates the sidewall 152 is approaching the second rear wall 1506. Once the second output signal is greater than a second threshold value, the sidewall 152 is against the second sidewall rear wall 1506.

A grounding layer 178 on a first face 180 of the sidewall 152 confines the capacitive field from the first and second sensors 170 and 174, respectively, to a second face 182 of the sidewall 152, wherein the second face 182 is opposite the first face 180. The grounding layer 178 is the X of the flooded X capacitive sensor.

The first door 108A has an interlocking groove, indicated generally at 184. The interlocking groove has a U-shape. The sidewall 152 has an extension portion, indicated generally at 186. When the first door 108A is closed, the extension portion 186 extends into the interlocking groove 184. As a result, movement of the sidewall 152 on the sidewall hinge 154 is limited.

Figure 6A:
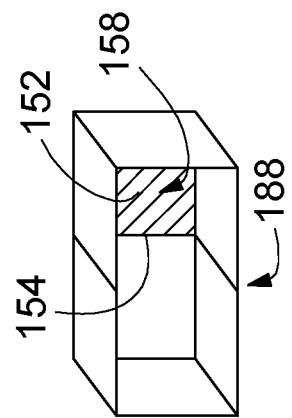
FIGS. 6A-6C are schematic perspective views of the storage compartments of FIG. 1 being configured into a first combined compartment.
Figure 6B:
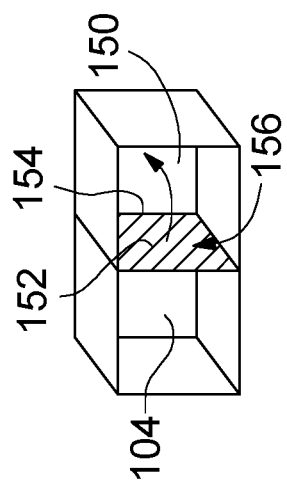
Figure 6C:
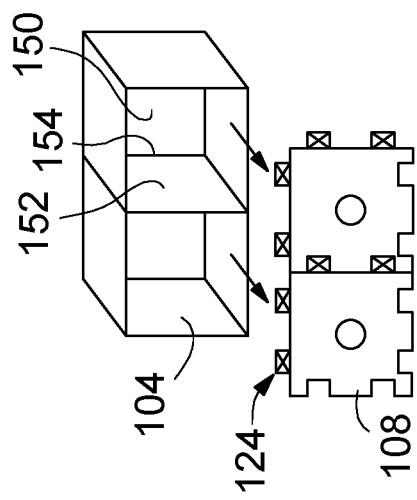

Referring now to FIGS. 6A-6C, two of the compartments 104 are reconfigured and combined or merged into a first combined or single compartment, indicated generally at 188. The two compartments 104 are any two adjoining compartments 104 in the system 102. As non-limiting examples, the two adjoining compartments 104 may be side by side or vertically stacked. The two compartments 104 have doors 108 and hinge assemblies 124 as previously discussed.

In FIG. 6A, the doors 108 for the two compartments 104 have been removed by unlocking the hinge assemblies 124 as discussed. Alternatively, as also discussed, the hinge assemblies 124 may be operated such that the doors 108 swing open. For example, the hinge assemblies 124 may be operated such that the doors 108, together or independently, swing left, right, upward, or downward to open the two compartments 104.

As illustrated, the hinge assemblies 124 between the two removed doors 108 remain locked. Alternatively, the hinge assemblies 124 between the two removed doors 108 may be unlocked when the doors 108 are removed such that the removed doors 108 may be separated and manipulated individually.

In FIG. 6B, with the doors 108 removed (or swung open), the sidewall 152 between the illustrated two storage compartments 104 is free to move from the first position 156 to the second position 158 by pivoting about the sidewall hinge 154. The sidewall 152 may be moved either manually or by the actuator 162. Once pivoted, as discussed, the sidewall 152 is latched against the rear wall 150. As viewed in FIG. 6B, the sidewall 152 pivots rightward. Alternatively, the sidewall 152 may pivot leftward as viewed in FIG. 6B.

In FIG. 6C, with the sidewall 152 latched against the rear wall 150, the first combined compartment 188 is established from the two compartments 104 illustrated in FIG. 6A. A package may then be loaded into the first combined compartment 188 and the doors 108 replaced (or swung closed). The hinge assemblies 124 then extend the plungers 138 to lock the doors 108 in place and secure the package in the first combined compartment 188.

Figure 7A:
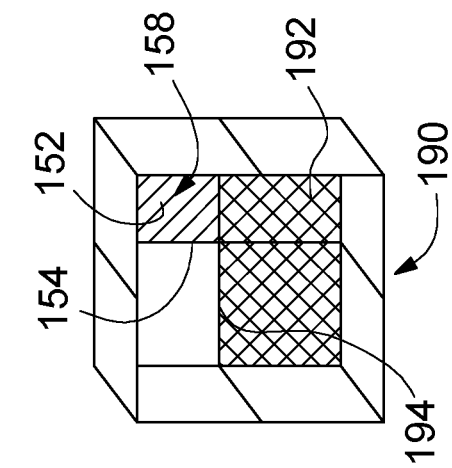
FIGS. 7A-7C are schematic perspective views of the storage compartments of FIG. 1 being configured into a second combined compartment.
Figure 7B:
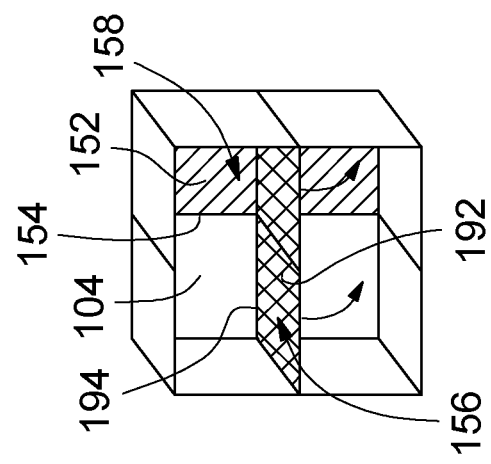
Figure 7C:
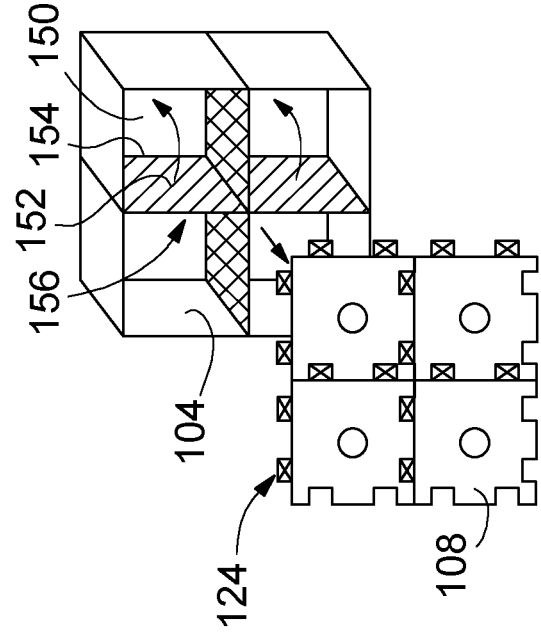

Referring now to FIGS. 7A-7C, four of the compartments 104 are reconfigured and combined or merged into a second combined or single compartment, indicated generally at 190. The four compartments 104 are any four adjoining compartments 104 arranged in a square—i.e., two rows and two columns—in the system 102. The four compartments 104 have doors 108 and hinge assemblies 124 as previously discussed.

In FIG. 7A, the doors 108 for the four compartments 104 have been removed by unlocking the hinge assemblies 124 as discussed. Alternatively, as also discussed, the hinge assemblies 124 may be operated such that the doors 108 swing open. For example, the hinge assemblies 124 may be operated such that the doors 108, together or independently, swing left, right, upward, or downward to open the four compartments 104.

As illustrated, the hinge assemblies 124 between the four doors 108 remain locked. Alternatively, the hinge assemblies 124 between the four doors 108 may be unlocked when the doors 108 are removed such that the doors 108 may be separated and manipulated individually.

Further in FIG. 7A, with the doors 108 removed (or swung open), the sidewalls 152 between the illustrated four compartments 104 are free to move from the first positions 156 to the second positions 158 by pivoting about the sidewall hinges 154. The sidewalls 152 may be moved either manually or by the actuator 162. Once pivoted, the sidewalls 152 are latched against the rear walls 150. As viewed in FIG. 7A, the sidewalls 152 pivot rightward. Alternatively, the sidewalls 152 may pivot leftward as viewed in FIG. 6B. Alternatively, as viewed in FIG. 7A, one of the sidewalls 152 may pivot rightward and the other of the sidewalls 152 may pivot leftward.

In FIG. 7B, second sidewalls 192 between the four compartments 104 are free to pivot about second sidewall hinges 194 from first positions 156 to second positions 158. Similar to the sidewalls 152, the second sidewalls 192 are pivoted on the second sidewall hinges 194 towards the rear walls 150. The second sidewalls 192 may be moved either manually or by an actuator. The second sidewalls 192 are then latched against the rear walls 150. As viewed in FIG. 7B, the second sidewalls 192 pivot downward. Alternatively, the second sidewalls 192 may pivot upward as viewed in FIG. 7B. Alternatively, as viewed in FIG. 7B, one of the second sidewalls 192 may pivot downward and the other of the second sidewalls 192 may pivot upward.

In FIG. 7C, with the sidewalls 152 and second sidewalls 192 latched against the rear wall 150, the second combined compartment 190 is established from the four compartments 104 illustrated in FIG. 7A. A package may then be loaded into the second combined compartment 190 and the doors 108 replaced (or swung closed). The hinge assemblies 124 then extend the plungers 138 to lock the doors 108 in place and secure the package in the second combined compartment 190.

The first and second combined compartments 188 and 190, respectively, were discussed as merely non-limiting examples of how the individual compartments 104 are combined or merged into larger compartments. The first and second combined compartments 188 and 190, respectively, do not limit the size and shape of the larger compartment formed. The compartments 104 may be combined into any size or shape of larger compartment, up until the size and shape of the larger compartment is every compartment 104 in the system 102.

Figure 9A:
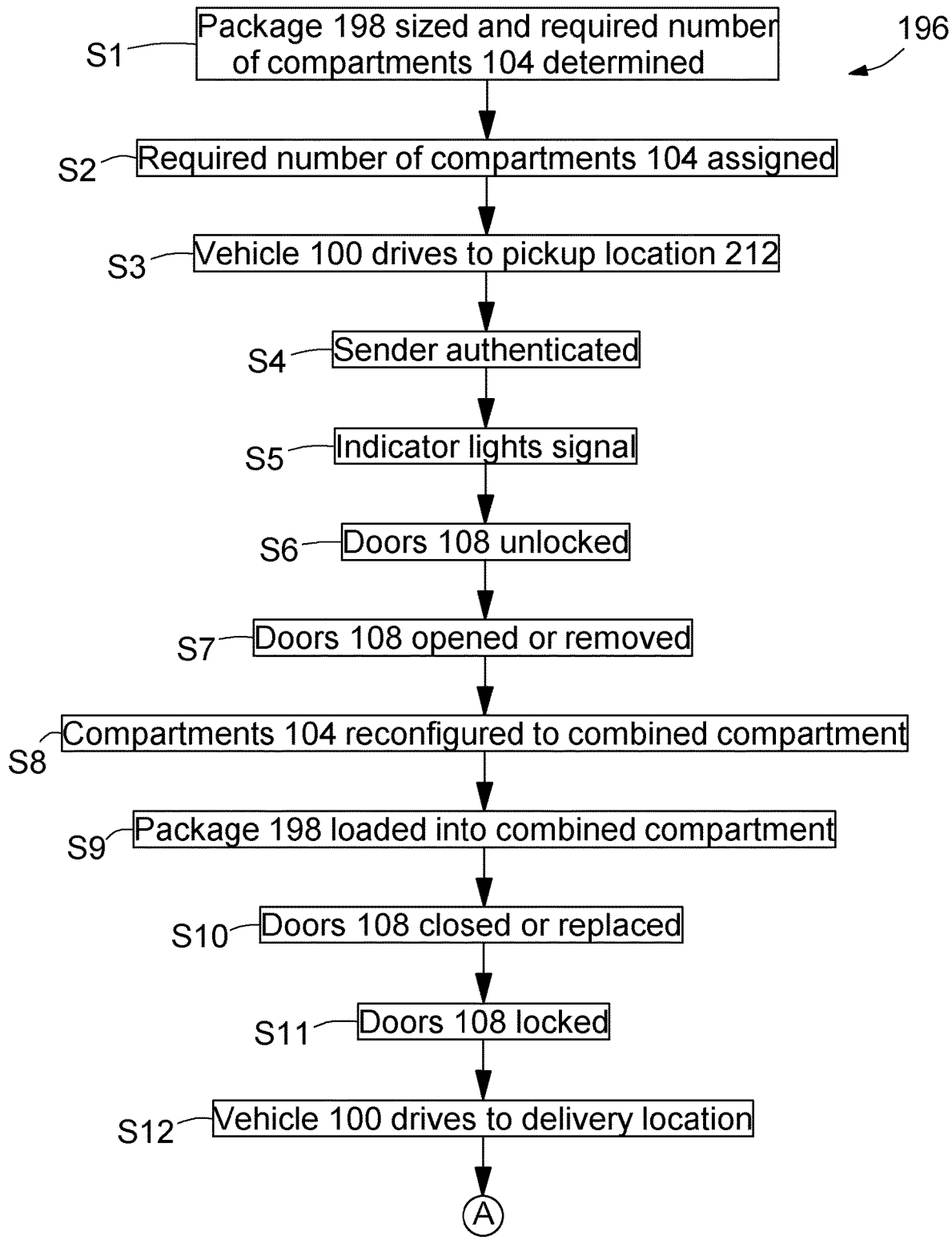
FIG. 9 is a flowchart of the method of FIG. 8.
Figure 9B:
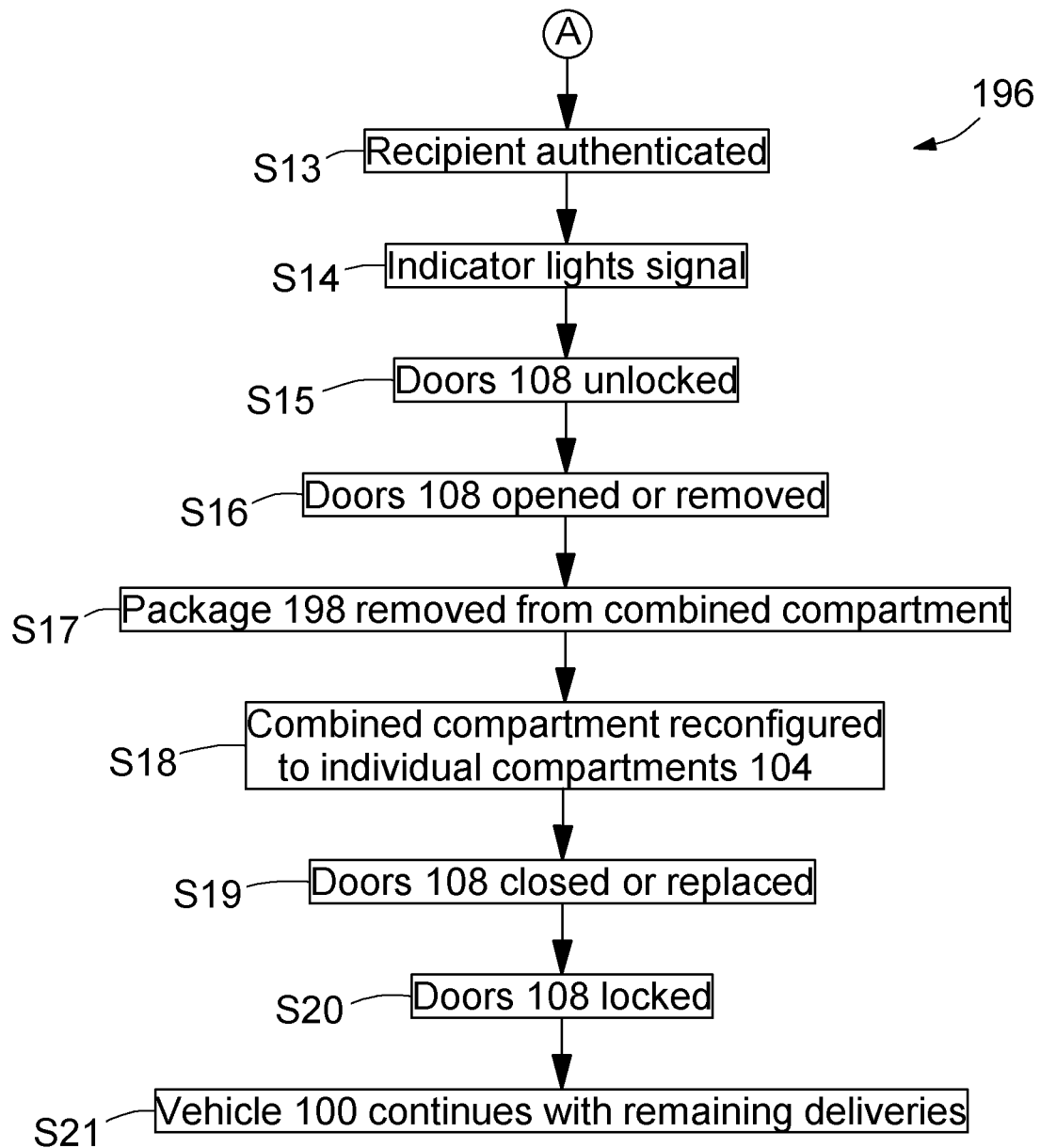

Referring now to FIGS. 8 and 9, there is illustrated a method 196 of shipping a package 198 from a sender to a recipient with the flexible storage compartment system illustrated in FIGS. 1-7C.

The method 196 is performed with the system 102 in combination with an application—i.e., app—or program on an electronic device 200. Preferably, the electronic device 200 is a smartphone or tablet computer. The electronic device 200 includes a microprocessor 202, a user interface 204, a camera 206, and a network connection 208. The network connection 208 is to a data network 210 such as the Internet and may include a cellular network connection between the electronic device 200 and the data network 210.

In a step S1, the package 198 is sized and a determination is made of how many of the compartments 104 are required to ship the package 198. The required number of the compartments 104 to ship the package 198 is determined as a function of the volume and shape of the package 198. As a non-limiting example, first and second packages may have the same volume but different shapes. When the first package is rectangular and the second package is square, the first and second packages will not fit in the same compartments 104 and different compartment assignments are needed for the first and second packages. Sizing of the package 198 will be discussed in detail with reference to FIGS. 10A-10D. In a step S2, the electronic device 200 communicates via the data network 210 with the vehicle 100 to locate and assign or otherwise reserve a group of the compartments that satisfy the required number of compartments 104 and will be used to ship the package 198. At the vehicle 100, the compartment assignment may be implemented by the microprocessors 144 in the individual doors 108. Alternatively, the compartment assignment may be implemented through a central controller for the system 102 that in turns communicates with and commands the microprocessors 144.

In a step S3, the vehicle 100 drives to the sender at a pickup location, indicated generally at 212. In a step S4, the system 102 authenticates the sender. As discussed, the authentication may use the interface 114 or the BLE radio 116. In a step S5, after the sender is authenticated, the indicator lights 112 signal to the sender which of the compartments 104 are to be used to ship the package 198. As discussed, the indicator lights 112 may signal to the sender by changing from red to green. In a step S6, the doors 108 for the assigned compartments 104 are unlocked by the command signal to the solenoids 136. Alternatively, the step S6 may proceed the step S5 or the steps S5 and S6 may be concurrent.

In a step S7, the doors 108 are opened or removed by the sender. With the unlocked doors 108 opened or removed, in a step S8, the compartments 104 are reconfigured to form a combined compartment—e.g., the first or second combined compartments 188 or 190, respectively. The compartments 104 are reconfigured as discussed for FIGS. 6A-7C. When the compartments 104 are manually reconfigured, the interface 114 may provide the sender with instructions and a sequence of how to move the sidewalls 152 (and second sidewalls 192 when needed).

Once the compartments 104 are reconfigured, in a step S9, the package 198 is loaded into the combined compartment. Then, in a step S10, the doors 108 are closed or replaced on the combined compartment. As discussed, the doors 108 may be replaced on any of the compartments 104 that form the combined compartment. In a step S11 the doors 108 are locked by the command signal to the solenoids 136 and, in a step S12, the vehicle 100 drives to the recipient at a delivery location, indicated generally at 214.

Upon arrival at the delivery location 214, in a step S13, the system 102 authenticates the recipient. As discussed, the authentication may use the interface 114 or the BLE radio 116. After the recipient is authenticated, in a step S14, the indicator lights 112 signal to the recipient which of the doors 108 are to be opened or removed. In a step S15, the doors 108 for the combined compartment are unlocked, by the command signal to the solenoids 136, to be opened or removed by the recipient. Alternatively, the step S15 may proceed the step S14 or the steps S14 and S15 may be concurrent. The recipient opens or remove the doors 108 for the combined compartment in a step S16, and, in a step S17 the recipient removes the package 198 from the combined compartment.

Then, in a step S18, the recipient restores the compartments 104 to their individual or separate states—i.e., reconfigures the combined compartment to individual or separate compartments 104—by placing the sidewalls 152 (and second sidewalls 192 when used) in their first positions. This restores the compartments 104 for future configuring for other shipments. In a step S19 the recipient closes or replaces the doors 108 and, in a step S20, the doors 108 are locked by the command signal to the solenoids 136. The package 198 is then considered delivered, indicated generally at 216. If the recipient does not restore the compartments 104 or close or replace the doors 108, the vehicle 100 may alert a supervisor so that corrective action may be taken.

Last, in a step S21, the vehicle 100 continues with its remaining deliveries while making any new pickups and deliveries.

The sender may perform both the step S1 of determining how many of the compartments 104 are required to ship the package 198 and the steps S7-S10 to open or remove the doors 108, reconfigure the compartments 104, load the package 198, and close or replace the doors 108. Alternatively, the step S1 may be performed by a first individual and the steps S7-S10 performed by a second individual. The first and second individuals need not be physically located together—i.e., the first individual may order the vehicle 100 for the second individual to load with the package 198.

When the vehicle 100 is one vehicle in a fleet of delivery vehicles, the electronic device 200 may communicate, via the data network 210, with a database 218 that tracks the fleet of delivery vehicles. As non-limiting examples, the database may track locations, future deliveries, available compartments 104, and occupied compartments 104. The electronic device 200 uses the information in the database 218 when selecting the vehicle 100 from the fleet in which to assign the required number of compartments 104 for shipping the package 198.

As described, the vehicle 100 continuously picks up additional packages to add to it deliveries. Alternatively, the vehicle 100 may be loaded once with at a central depot for a schedule of deliveries. At the central depot, the compartments 104 are reconfigured into multiple larger compartments and loaded with packages, one larger compartment for each delivery. The vehicle 100 then delivers the packages without picking up additional packages en route to the deliveries.

Figure 10A:
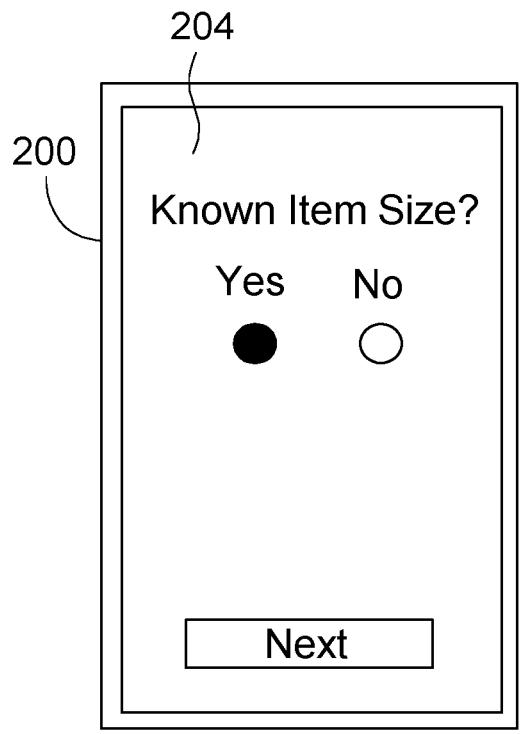
FIGS. 10A-10D are schematic views of sizing a package as part of the method of FIG. 8.
Figure 10B:
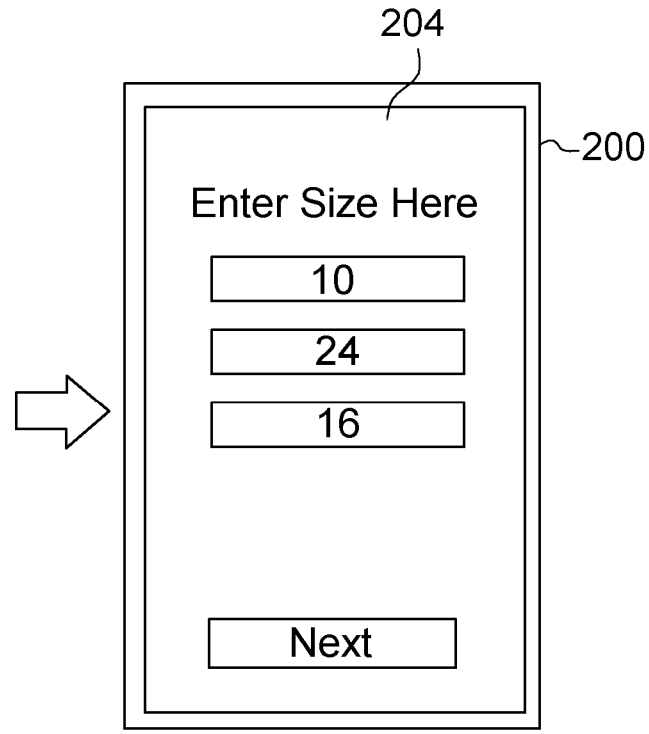

Referring now to FIGS. 10A-D, there is illustrated in detail the step S1 of determining how many of the compartments 104 are required to ship the package 198. The user interface 204 asks the sender if dimensions of the package 198 are known. In FIG. 10A, the sender answers, via the user interface 204, that the dimensions of the package 198 are known and, in FIG. 10B, the sender uses the user interface 204 to input the dimensions of the package 198.

Figure 10C:
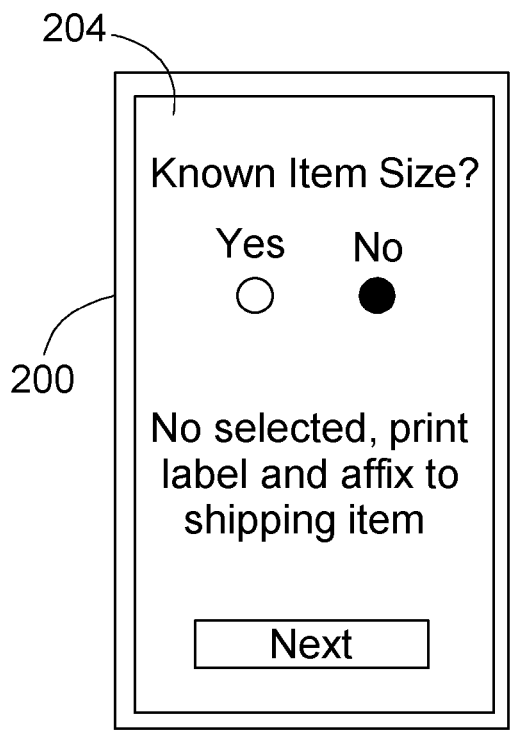

Alternatively, in FIG. 10C, the sender answers, via the user interface 204, that the dimensions of the package 198 are not known. The sender then prints a sizing guide 220 (illustrated in FIG. 10D) of known size and affixes the sizing guide 220 to a first elevation 222 of the package 198. Preferably, the sizing guide 220 is the size of one of the storage compartments 104. As a non-limiting example, the sizing guide 220 may be a label that is adhered to the package 198.

Figure 10D:
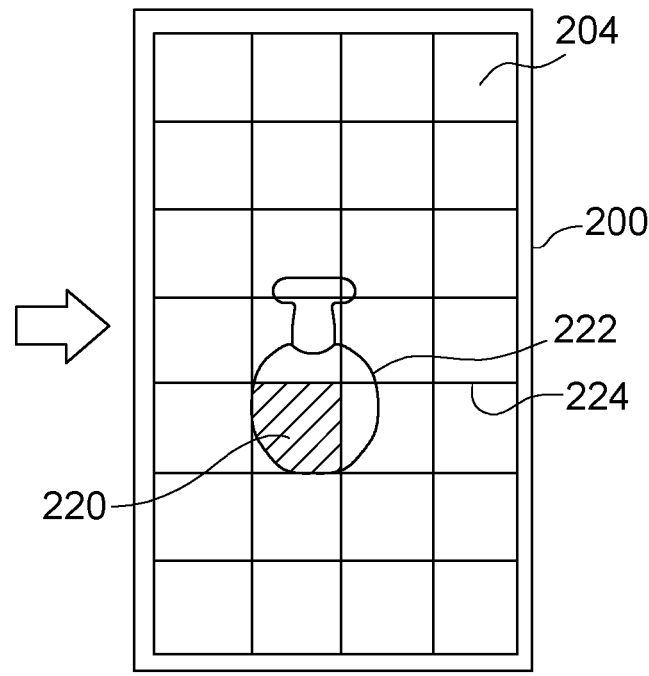

In FIG. 10D, the camera 206 captures an image of the package 198 with the sizing guide 220. Both the package 198 and sizing guide 220 are displayed on the user interface 204 with an overlaid grid 224. Preferably, boxes in the grid 224 each have a size that corresponds with or otherwise matches the size of one of the compartments 104. The sender moves the electronic device 200 until the sizing guide 220 fills one of the boxes of the grid 224—i.e., the sizing guide 220 is aligned with the grid 224. The sender then selects the boxes of the grid 224 that at least a portion of the package 198 is in. From the selected boxes, a height and width of the first elevation 222 is determined.

The sender then moves the sizing guide 220 to a second elevation that is positioned 90 degrees from the first elevation 222 and repeats moving the electronic device 200 until the sizing guide 220 fills one of the boxes of the grid 224 and selecting the boxes of the grid 224 that at least a portion of the second elevation of the package 198 is in to determine a depth of the package 198. As a result, because the size of the sizing guide 220 and boxes of the grid 224 are known, the size of the package 198 may be determined—i.e., the height, width, and depth—by the electronic device 200.

Alternatively, the step S1 of determining how many of the compartments are required to ship the package 198 may be other than as discussed for FIGS. 10A-10D.

Figure 11:
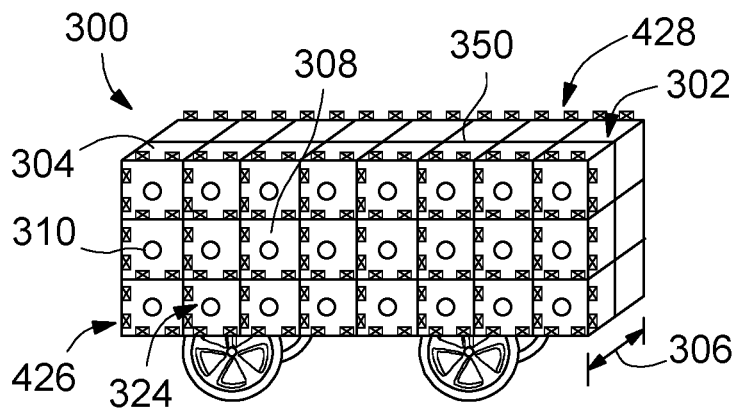
FIG. 11 is a schematic perspective view of a second autonomous delivery vehicle having the flexible storage compartment system.

Referring now to FIG. 11, there is schematically illustrated a second delivery vehicle, indicated generally at 300, having a flexible storage compartment system, indicated generally at 302. Because the vehicle 300 and system 302 are variations of the vehicle 100 and system 102 of FIGS. 1-10D, like reference numerals, increased by 200, designate corresponding parts in the drawings and detailed description thereof will be omitted.

The system 302 has first and second banks, indicated generally at 426 and 428 respectively, of storage compartments 304. The compartment doors 308 for the compartments 304 in the first bank 426 face in a first direction and the doors 308 for the compartments 304 in the second bank 428 face in a second direction that is opposite the first direction. The compartments 304 in the first and second banks 426 and 428, respectively, share common rear walls 350. Alternatively, the compartments 304 in the first and second banks 426 and 428, respectively, may have their own rear walls 350.

Figure 12:
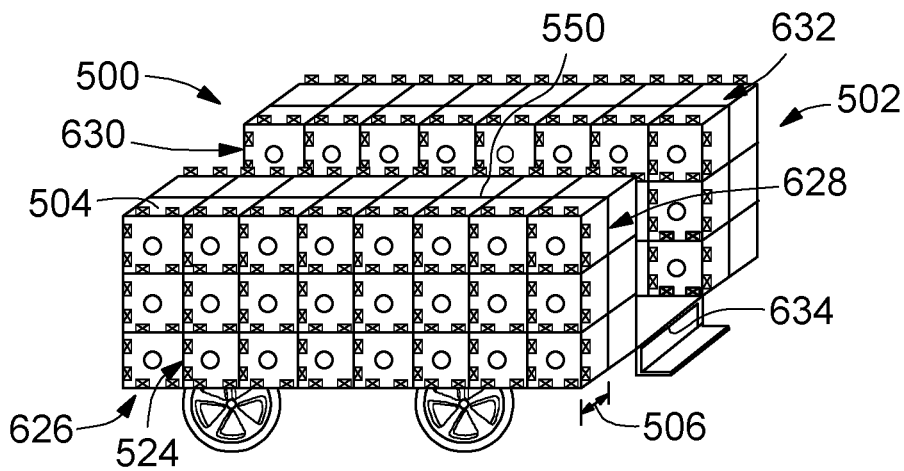
FIG. 12 is a schematic perspective view of a third autonomous delivery vehicle having the flexible storage compartment system.

Referring now to FIG. 12, there is schematically illustrated a third delivery vehicle, indicated generally at 500, having a flexible storage compartment system, indicated generally at 502. Because the vehicle 500 and system 502 are variations of the vehicle 100 and system 102 of FIGS. 1-10D, like reference numerals, increased by 400, designate corresponding parts in the drawings and detailed description thereof will be omitted.

The system 502 has first, second, third, and fourth banks, indicated generally at 626, 628, 630, and 632, respectively, of storage compartments 504. The second and third banks 628 and 630, respectively, are separated by an access aisle 634. The compartment doors 508 for the compartments 504 in the first bank 626 face in a first direction and the doors 308 for the compartments 304 in the second bank 628 face in a second direction that is opposite the first direction. Similarly, the compartment doors 508 for the compartments 504 in the third bank 630 face in the first direction and the doors 508 for the compartments 504 in the fourth bank 632 face in the second direction.

The compartments 504 in the first and second banks 626 and 628, respectively, share common rear walls 550. Alternatively, the compartments 504 in the first and second banks 626 and 628, respectively, may each have their own rear walls 550. Similarly, the compartments 504 in the third and fourth banks 630 and 632, respectively, share common rear walls 550. Alternatively, the compartments 504 in the third and fourth banks 630 and 632, respectively, may have their own rear walls 550.

Figure 13:
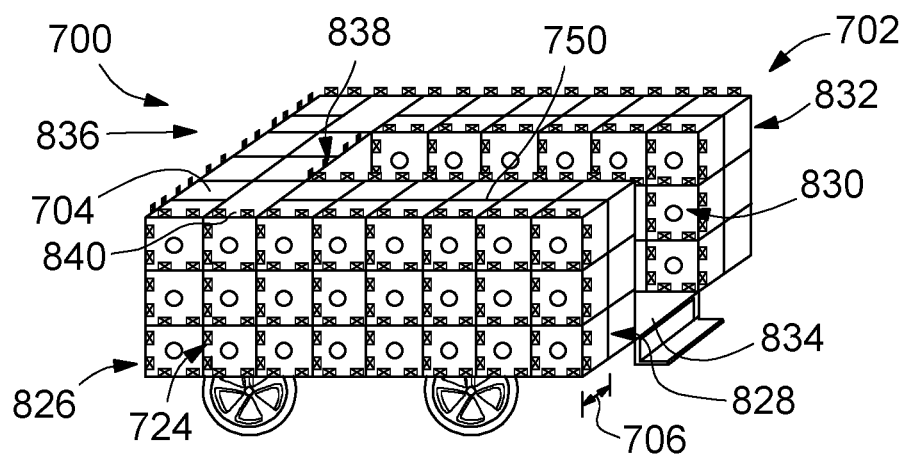
FIG. 13 is a schematic perspective view of a fourth autonomous delivery vehicle having the flexible storage compartment system.

Referring now to FIG. 13, there is schematically illustrated a fourth autonomous delivery vehicle, indicated generally at 700, having a flexible storage compartment system, indicated generally at 702. Because the vehicle 700 and system 702 are variations of the vehicle 100 and system 102 of FIGS. 1-10D, like reference numerals, increased by 600, designate corresponding parts in the drawings and detailed description thereof will be omitted.

The system 702 has first, second, third, fourth, fifth, and sixth banks, indicated generally at 826, 828, 830, 832, 836, and 838 respectively, of storage compartments 704. The second and third banks 828 and 830, respectively, are separated by an access aisle 834. The fifth and sixth banks 836 and 838, respectively, span between the second and third banks 828 and 830, respectively, with the compartments 704 of the sixth bank 836 being accessible from the aisle 834.

The compartment doors 708 for the compartments 704 in the first bank 826 face in a first direction and the doors 708 for the compartments 704 in the second bank 828 face in a second direction that is opposite the first direction. Similarly, the compartment doors 708 for the compartments 704 in the third bank 830 face in the first direction and the doors 708 for the compartments 704 in the fourth bank 832 face in the second direction. The doors 708 for the compartments 704 in the fifth bank 836 face in a third direction and the doors 708 for the compartments 704 in the sixth bank 838 face in a fourth direction that is opposite the third direction. The first and second directions are perpendicular to the third and fourth directions.

The compartments 704 in the first and second banks 826 and 828, respectively, share common rear walls 750. Alternatively, the compartments 704 in the first and second banks 826 and 828, respectively, may have their own rear walls 750 that abut. Similarly, the compartments 704 in the third and fourth banks 830 and 832, respectively, share common rear walls 750. Alternatively, the compartments 704 in the third and fourth banks 830 and 832, respectively, may have their own rear walls 750 that abut. Similarly, the compartments 704 in the fifth and sixth banks 836 and 838, respectively, share common rear walls 750. Alternatively, the compartments 704 in the fifth and sixth banks 836 and 838, respectively, may have their own rear walls 750 that abut.

The system 702 further has storage compartments 840 with an increased depth, but are otherwise the same as the compartments 704.

While certain embodiments of the present invention have been described in detail, those familiar with the art to which this invention relates will recognize various alternative designs and embodiments for practicing the invention as defined by the following claims.

The invention claimed is:

1. A flexible storage compartment system for a delivery vehicle, the system comprising:
adjoining first and second compartments with a common sidewall that is pivotable about a hinge;
a first removable door closing the first compartment;
a second removable door closing the second compartment, wherein the first and second doors are interchangeable between the first and second compartments;
a latching assembly between the first door, second door, and sidewall, wherein both the first and second doors are open when the latching assembly allows the sidewall to move;
hinge assemblies connecting the first and second doors, wherein the hinge assemblies have solenoids selectively operable between locked and unlocked states;
contact and wiper assemblies between the first and second doors, wherein the contact and wiper assemblies carry electrical power and command signals for the solenoids;
an electronic device for sizing a package and assigning the first and second compartments, wherein the first and second compartments combine into a single compartment by pivoting the sidewall when the first and second doors are both open.

2. The system of claim 1 further comprising:
a frame portion adjoining the first and second doors, wherein the hinge assemblies connecting the first and second doors are first hinge assemblies and second hinge assemblies connect the first and second doors to the frame portion.

3. The system of claim 1 further comprising:
a plunger for each of the hinge assemblies, wherein the plunger is extended as a hinge in the locked state and retracted in the unlocked state.

4. The system of claim 3 further comprising:
a first hinge cavity in the first door;
a second hinge cavity in the second door, wherein the solenoid in the locked state extends the plunger through the first hinge cavity and into the second hinge cavity.

5. The system of claim 1 further comprising:
an indicator light for each of the first and second doors, wherein the indicator light signals if the corresponding first or second door is locked or unlocked.

6. The system of claim 1 further comprising:
a first sensor for the first door, wherein the first sensor communicates a first output signal that the first door is closed;
a rear wall of the second compartment;
a second sensor for the sidewall, wherein the second sensor communicates a second output signal that the sidewall has been moved against the rear wall.

7. The system of claim 1 wherein the first and second doors are removed from the first and second compartments when the first and second doors are open.

8. The system of claim 1 further comprising:
a sizing guide, wherein the sizing guide is affixed to the package for the electronic device to size the package.

9. The system of claim 1 further comprising:
an actuator to move the sidewall.

10. A delivery vehicle comprising:
separate compartments with a common sidewall;
interchangeable doors closing the compartments;
a latching assembly between the doors and sidewall that limits movement of the sidewall when only one of the doors is closed, wherein the compartments are combined by moving the sidewall when the doors are open;
a hinge assembly connecting the doors;
a contact and wiper assembly between the doors that carries power and commands for the hinge assembly.

11. The delivery vehicle of claim 10 further comprising:
an electronic device for sizing a package and assigning the compartments.

12. The delivery vehicle of claim 11 further comprising:
a sizing guide, wherein the sizing guide is affixed to the package for the electronic device to size the package.

13. The delivery vehicle of claim 10 further comprising:
a solenoid in the hinge assembly, wherein the solenoid is responsive to the commands, has a locked state wherein an extended plunger is a hinge, and has an unlocked state in which the plunger is retracted.

14. A method of shipping a package in a delivery vehicle having a flexible storage compartment system with first and second compartments with a common sidewall, a first door closing the first compartment, and a second door closing the second compartment, the method comprising:
sizing the package with an electronic device;
assigning the first and second compartments with the electronic device;
unlocking the first and second doors, wherein a command signal to unlock the first and second doors is carried by a contact and wiper assembly between the first and second doors;
opening the first and second doors;
moving the sidewall to combine the first and second compartments into a combined compartment, wherein both the first and second doors are open when the sidewall moves;
loading the package in the combined compartment;
replacing the first and second doors, wherein the first and second doors are interchangeable between the first and second compartments.

15. The method of claim 14 wherein the first and second doors are opened by detaching the first and second doors from the first and second compartments.

16. The method of claim 14 further comprising:
affixing a sizing guide to the package;
aligning the sizing guide to a grid displayed on a user interface of the electronic device to size the package.

17. The method of claim 14 further comprising:
driving the delivery vehicle to a pickup location when the first and second compartments are assigned;
driving the delivery vehicle to a delivery location when the first and second doors are replaced, wherein the delivery vehicle is self driving.

18. The method of claim 17 further comprising:
authenticating a recipient at the delivery location;
sending the command signal to unlock the first and second doors at the delivery location;
opening the first and second doors at the delivery location;
removing the package from the combined compartment;
moving the sidewall to restore the combined compartment to the first and second compartments;
replacing the first and second doors.

19. The method of claim 14 further comprising:
authenticating a sender before sending the command signal to unlock the first and second doors.

20. The method of claim 14 further comprising:
signaling with an indicator light to identify the first and second doors.

* * * * *